UNITED STATES PATENT OFFICE.

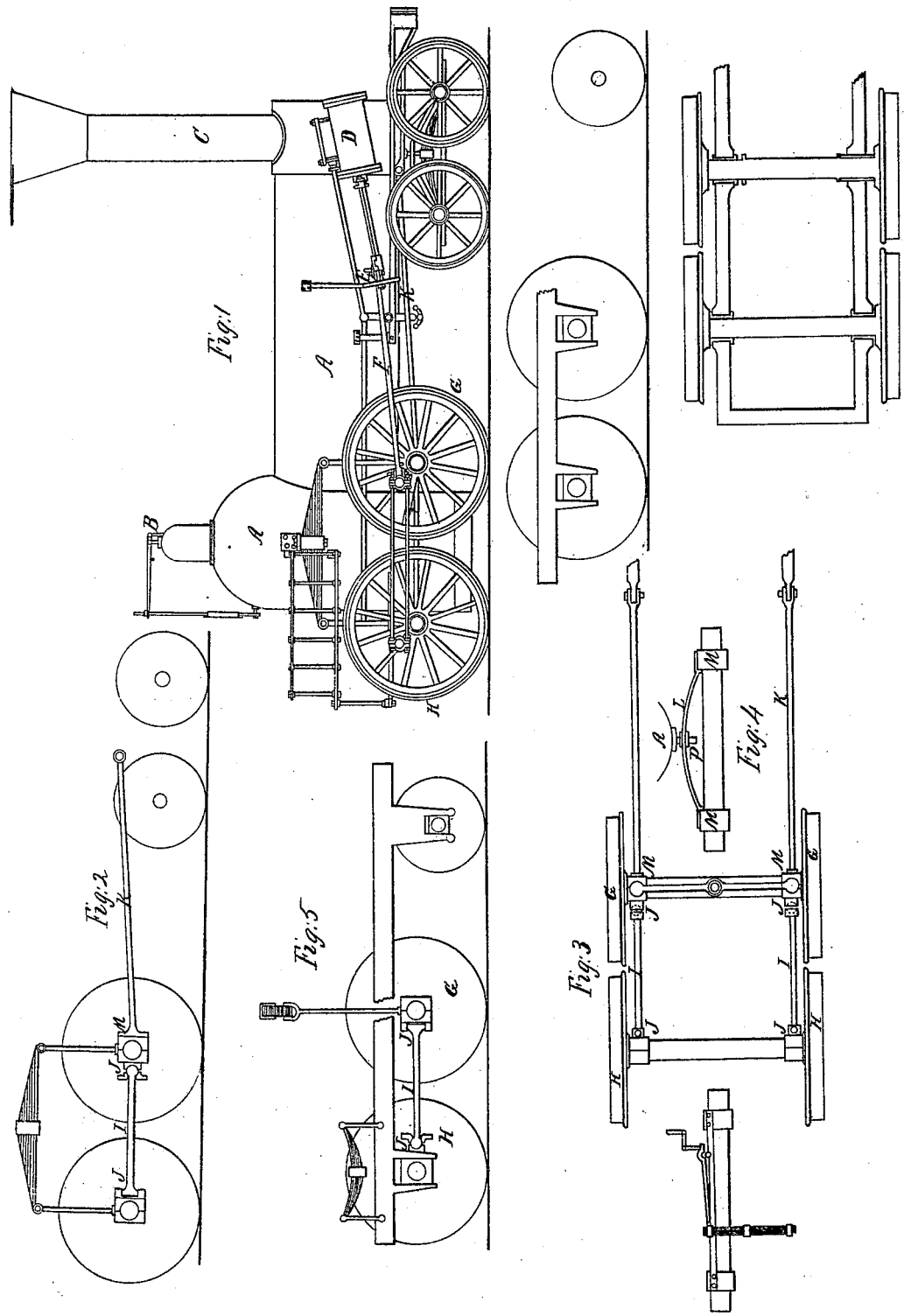

HENRY WATERMAN, OF HUDSON, NEW YORK.

METHOD OF CONSTRUCTING LOCOMOTIVE-ENGINES FOR RAILROADS.

Specification of Letters Patent No. 1,969, dated February 10, 1841.

*To all whom it may concern:*

Be it known that I, HENRY WATERMAN, of the city of Hudson, county of Columbia, and State of New York, have invented certain new and useful Improvements in the Construction of Locomotive-Engines for Railways, which are described as follows, reference being had to the annexed drawings of the same, making part of this specification.

Figure 1 represents a side elevation of the locomotive engine. Fig. 2 represents a vertical section of a part of the engine showing the manner of applying the improvements. Fig. 3 represents a horizontal section showing the improvements. Fig. 4 is a vertical transverse section of the forward axle showing an improvement. Fig. 5 is a side elevation of another modification of the improvement.

Similar letters refer to similar parts in the figures.

In the ordinary engine having more than one pair of driving wheels and the usual truck or pilot wheels, there is experienced great loss of power from an undue degree of friction arising from the want of sufficient facility of vibration in turning curves and in cases where the track is undulatory, and also where the track is of an ordinary degree of perfection, the engine when traveling at a rapid rate has a serpentine and vibratory motion arising from the momentum of the oscillating parts of the engine and from other causes. To remedy these evils I construct my engine in the following manner: The engine is generally made like other engines such as the boiler A; the safety valve B; the chimney C; the cylinder D; the cross head E; the connecting rod F; the driving wheels G, and some other parts.

My improvements consist principally in so constructing the engine as to allow one pair of driving wheels to have an easy lateral and vertical vibratory movement which is effected in the following manner. The main driving wheels G are connected to the frame of the engine in the ordinary manner. The vibratory driving wheels H are connected to the main driving wheels G by connecting rods I having suitable joints J at their extremities which allow the wheels to have the necessary vibration, and keep the axes of the axles always parallel, and at the same distance from each other and avoiding the danger of the breaking of the cranks by lengthening the distance of the axes as in the old mode of construction in traveling over an undulatory road, or in passing over protuberances on the rails.

In the common engine constructed with the ordinary frame and pedestals there arises a serious evil from the constant wear of the pedestals and boxes and an excessive straining of the frame and joints by the working of the engine. To obviate these evils and likewise to dispense with the ordinary heavy and expensive frame, I substitute comparatively light and strong rods K K connected to the boxes M and base of the cylinder or other convenient place by suitable joints which hold firmly the boxes of the main driving axle and resist the oscillating action of the pistons and their connections. Also to prevent the boiler from having a lateral vibratory movement I attach it to the main axle by a bar L attached firmly to the boxes M of the main axle in any convenient manner through which bar passes a vertical pin P projecting from the bottom of the boiler and working freely, in an opening in said bar.

What I claim as my invention and which I desire to secure by Letters Patent is—

The particular mode of connecting the rear and front driving wheels by means of jointed rods placed at each end of said axle, so constructed as to enable the wheels to have a lateral and vertical motion to enable them to accommodate themselves to the curvature of the track and pass over whatever obstacles may intervene without danger to the engine; and in connecting the main boxes of the main driving axle to the base of the cylinder, or other convenient plate, by jointed rods so as to hold them firmly and thus resist the strain on the axle and joints of the ordinary frame produced by the oscillating action of the pistons and their connections and thereby to dispense with the usual frame and pedestals which, with the boxes are constantly liable to wear from the causes before stated and I claim the above mentioned improvements whether they are effected in the manner herein set forth or in any other mode substantially the same and the last named improvement to be applied also to engines having but one pair of driving wheels.

HENRY WATERMAN.

Witnesses:
J. W. FAIRFIELD,
C. SMITH.